3,238,121
HYDROCARBON CONVERSION PROCESS AND
APPARATUS USEFUL THEREFOR
Peter S. Parkin, Tempestowe, Victoria, Australia, assignor to Socony Mobil Oil Company, Inc., a corporation of New York
Filed Mar. 12, 1963, Ser. No. 264,671
15 Claims. (Cl. 208—165)

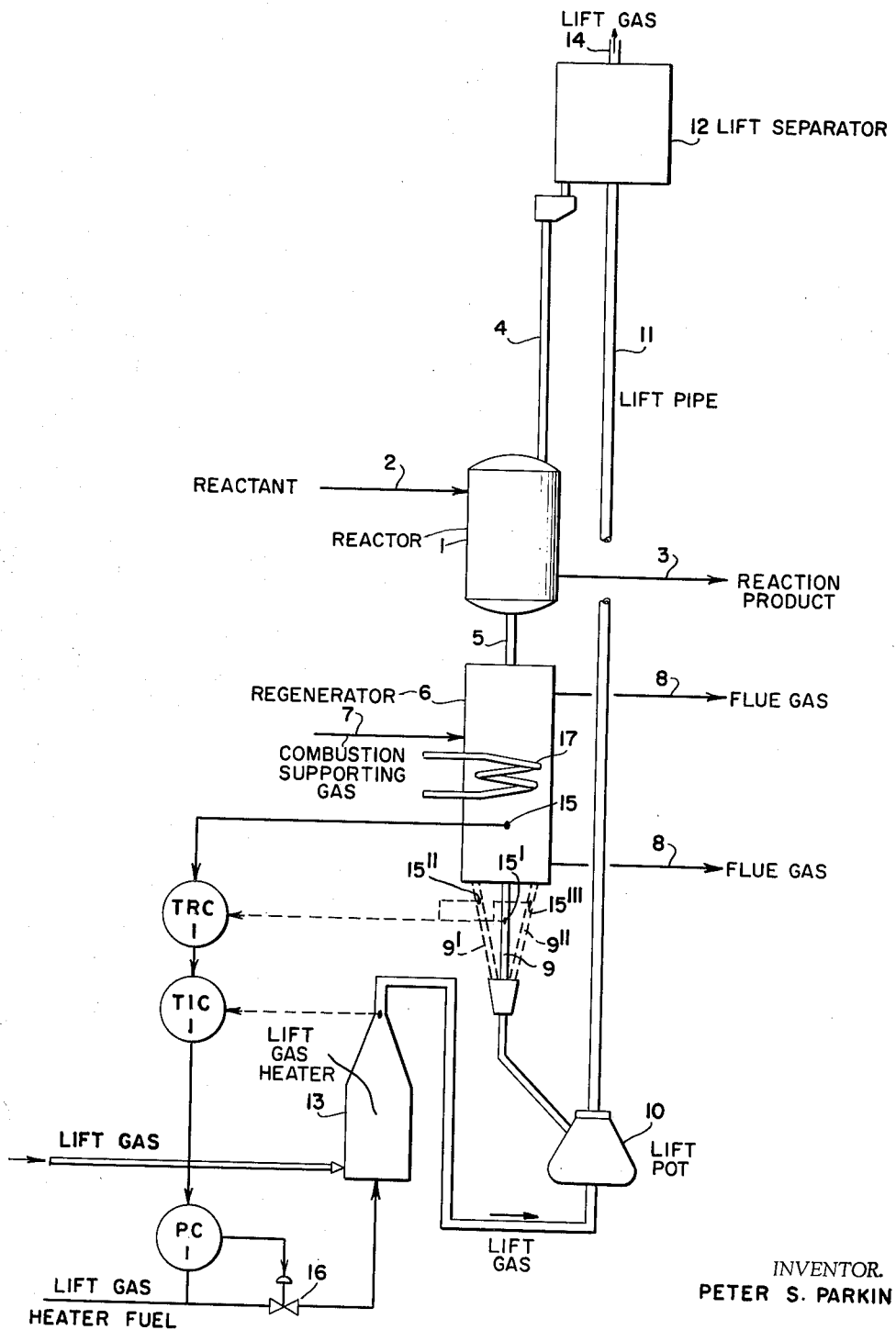

This invention relates to a method for the conversion of hydrocarbons and, more particularly, for carrying out such a conversion with improved control over the temperature at which such hydrocarbon conversion takes place. The invention also relates to apparatus adapted for carrying out such an improved process.

Many processes in the petroleum field, such as cracking, polymerization, reforming, coking and desulfurization, use gravitating columns of granular contact solids at elevated temperatures in an enclosed cyclic system. For example, in cracking heavy petroleum stocks to produce lighter hydrocarbons, preferably boiling in the gasoline boiling range, the granular solids are gravitated as a substantially compact bed through a reaction zone where it is contacted with hydrocarbons to effect the cracking reactions, and the converted products are continuously withdrawn from the bed. This process is exemplified by the so-called "moving-bed" or TCC process for hydrocarbon cracking, and this invention will be described wtih respect to particular application thereto, although it will be appreciated that the invention finds application in a variety of processes and is not limited solely thereto.

During gravitation through the reaction zone, the granular particles of solid contact material acquire deposits of carbonaceous matter commonly referred to by those familiar with the art as "coke," which must be removed periodically. The granular solids are permitted to continuously gravitate from the bottom of the reaction zone, through suitable conduit means into a regeneration zone or kiln, in which the granular solids continuously gravitate as a compact bed and are contacted with a combustion-supporting gas (e.g. air) to effect the combustion of the deposited matter or coke and thereby render the particles suitable for reuse in the reaction zone. Flue gases are continuously removed from the regeneration zone, carrying with them some of the heat produced by the combustion. In some instances additional portions of the heat produced by the combustion are withdrawn from the granular solids being regenerated in a cooling zone, located intermediate between the upper end portion and the lower end portion of the regeneration zone, usually employing a fluid medium to carry off the heat absorbed through the walls of conduits within which the fluid flows. From the lower portion of the regeneration zone or kiln, the granular solids continuously gravitate into a lift pot which is at the lower end of a pneumatic lift. In the lift, the granular solids are elevated in and by a rapidly rising stream of lift gas, generally air, through a lift pipe and deposited at the upper end of the lift into a lift separator. The granular solids then flow from the bottom of the lift separator in compact gravitating form to maintain the confined column of descending granular solids which comprises the bed of granular solids in the reaction zone, the bed of granular solids in the regeneration zone, and the granular solids in the conduit means connecting the reaction zone and the regeneration zone and in the conduit means connecting the regeneration zone and the lower end of the pneumatic lift.

To avoid premature cracking and the concomitant coking of the hydrocarbon feed, i.e. before it is fed to the reaction zone, it is desirable that the hydrocarbon feed temperature is not raised to the cracking temperature range before the feed enters the reaction zone. To supply the heat required to bring the feed introduced at sub-cracking temperature into the cracking temperature range, the granular solids are fed to the reaction zone at a temperature somewhat above the optimum cracking temperature for the desired reaction. When the hydrocarbon feed at a temperature below its cracking range contacts the granular solids at a temperature above that of the hydrocarbon feed in the reaction zone, the aggregate or "mix" temperature is desirably within the temperature range in which the cracking operation will proceed most efficiently. The temperature ranges within which conventional cracking reactions are carried out are generally in the range of from 800 to 1000° F., and in many cases, from about 900 to about 975° F.

The nature of the hydrocarbon feed generally determines the temperature to which it can be heated before being fed to the reaction zone without incurring undesirable premature cracking, and this temperature is generally within the range of from 700–900° F. Given a temperature in this range as the maximum reaction zone hydrocarbon feed inlet temperature, the heat capacities of the granular solids and hydrocarbon feed, the heat of vaporization characteristics of the hydrocarbon feed, the flow rates of granular solids and hydrocarbons in the reaction zone, and the optimum cracking temperature range of the feed, the temperature of granular solids being fed to the reaction zone which is the minimum for efficient cracking can readily be determined. However, a narrow range of operable reaction zone inlet temperatures of the granular solids is often imposed by characteristics of the moving-bed process. For instance, an upper temperature limit for the granular solids being fed to the reaction zone is generally fixed at approximately 1075° F. by the design characteristics of the pneumatic lift systems in common use at the present time.

Thus, it is important that the reaction zone inlet temperature of the granular solids should be controlled within fairly close limits for efficient cracking. Further, it is apparent that the uniformity of the cracking operation will depend to a considerable extent on the maintenance of a reaction zone inlet temperature of the granular solids which is uniform with respect to time. That is, unless the reaction zone granular solids inlet temperature is maintained substantially constant, the cracking temperature will vary, the resulting product distribution will vary, and the overall efficiency of the process will be impaired.

However, a number of variable conditions in the cracking-regeneration cycle of the granular solids influence the reaction zone granular solids inlet temperature sufficiently enough so that, as moving-bed processes are currently operated, there cannot be had a reaction zone granular solids inlet temperature of the required uniformity without countervailing measures being frequently applied to the process. For instance, the relatively frequent variations in the nature of the crude oils being processed alter the amount of coke deposited on the granular solids in the reaction zone and thereby the amount of heat produced and absorbed by the granular solids during coke combustion in the regeneration zone. Alterations of the granular solids:oil ratio required by changes in the nature of the crude oil being processed affect the granular solids-oil mix temperature in the reactor. Changes in recycle rate can alter the mix temperature, by causing the nature of the feed or the granular solids:oil ratio to vary, and variations in the rate or nature of the fluid used in the cooling zone or of the combustion-supporting gas used to regenerate the granular solids can also affect the mix temperature. These and other variables of lesser importance, such as the catalytic activity of the granular solids and atmospheric conditions preclude a steady-state operation in which the cracking temperature in the reaction zone remains substantially constant without frequent corrective measures. Since these variables fluctuate frequently, corrective measures should be applied as frequently as possible or even continuously to maintain a desired reaction temperature.

The deviations in cracking temperature caused by the above-described variables generally have a cumulative effect. For instance, a different hydrocarbon feed which causes a greater deposition of coke causes thereby a higher temperature of the granular solids following combustion of the coke, and the resulting higher cracking temperature in the reaction zone contributes to an even greater rate of coke deposition than the different hydrocarbon feed would alone have caused. The cumulative tendency of these variables further emphasizes the necessity for continuous control of granular solids temperatures in the system.

A variable of the moving-bed process readily controllable as a corrective of granular solids temperature is the temperature of the gas used in the pneumatic lift. Conventional moving-bed installations are equipped with lift gas heaters having the capacity to heat a normally used stream of lift gas from ambient temperatures to a temperature between 300 and 1000° F. It is evident from the use of this gas to carry upward at rapid velocities the small granular solids thoroughly dispersed within it that the granular solids temperature can be significantly affected by the temperature of the lift gas. Since the lift gas temperature is the last major factor to affect the temperature of the granular solids before they are returned to the reaction zone, it has great value as a variable controllable to compensate for the effects of normally-encountered variations in other process variables on the cracking temperature. Further, in view of the desirability of maintaining the reaction zone granular solids inlet temperature within narrow limits and in view of the ready tendency of the frequent granular solids temperature disturbances to become cumulative, it is highly desirable to devise a means for a constant and accurate lift gas temperature control responsive to any changes in the deviation in temperature of the regenerated granular solids from the reaction zone granular solids inlet temperature most desirable in view of its effect on process efficiencies.

Accordingly, it is an object of this invention to provide a method, and apparatus for carrying out such a method, for controlling the temperature at which a hydrocarbon conversion reaction takes place.

It is a further object of this invention to provide an improved method, and means suitable for use therefor, for controlling the temperature at which hydrocarbon conversion takes place in a process in which normally-encountered process variables tend to impair process efficiency by causing frequent and cumulative disruptions of the desired reaction temperature level.

It is a further object of this invention to provide an improved method, and apparatus for carrying out same for controlling the temperature at which heavy petroleum hydrocarbons are converted to lighter hydrocarbons in a process involving the recycle of granular solids to a hydrocarbon reaction zone from a regeneration zone in which the granular solids are rendered suitable for reuse in the process.

It has now been discovered that the above objects can be realized by controlling the heating, in a lift-gas heating zone, of the gas used for transporting the regenerated granular solids to the reaction zone, by means responsive to the temperature of the regenerated granular solids measured at a point in the cyclic flow of the granular solids from and including the lower portion of the regeneration zone to the pneumatic transport of the granular solids to the reaction zone. Thus, illustrated by a continuous process employing a moving-bed system for the conversion of a petroleum hydrocarbon feed wherein said petroleum hydrocarbon feed is contacted in a reaction zone under conversion conditions including an elevated temperature with a mass of granular downwardly-gravitating solids, conversion product and spent granular solids are continuously withdrawn from the reaction zone, the spent granular solids are continuously downwardly passed from the reaction zone to a regeneration zone wherein carbonaceous deposits from the conversion reaction are combustibly removed from the granular solids, the regenerated granular solids are continuously withdrawn from the regeneration zone and therefrom pneumatically transported to the reaction zone by a lift-gas which prior to such use is heated in a lift-gas heating zone, the present invention provides a method and apparatus for controlling the temperature of the granular solids entering the reaction zone. This is accomplished, in accordance with this invention, by utilizing temperature measurement of the regenerated granular solids at a defined portion of the cyclic process as a means for automatic control of the heating of the lift gas in the lift-gas heating zone. Thus, in more specific embodiment, the invention is carried out by generating an input function representative of the temperature of the regenerated granular solids measured at a point in the flow of the granular solids from and including the lower portion of the regeneration zone to the pneumatic transport of the granular solids to the reaction zone, converting the input function to a signal proportional to the difference between the temperature represented by the input function and a desired temperature of the regenerated granular solids entering the reaction zone, and applying the signal to control the heating of the lift gas in the lift-gas heating zone. In a particularly suitable embodiment, such control is exercised over the fuel input to the heating zone.

Illustrated by an apparatus for the conversion of a petroleum hydrocarbon feed, which comprises a reactor wherein said petroleum hydrocarbon feed is contacted under conversion conditions including an elevated temperature with a mass of granular downwardly-gravitating solids and from which conversion product and spent granular solids are continuously withdrawn, conduit means through which the spent granular solids are continuously downwardly passed from the reactor to a regenerator, wherein carbonaceous deposits from the conversion reaction are combustibly removed from the granular solids, conduit means through which the regenerated granular solids are continuously passed from the regenerator to a pneumatic transport means, wherein the regenerated granular solids are transported by a lift gas to the reactor, and lift-gas heating means wherein gas to be used in the pneumatic transport means is heated prior to such use, the present invention provides a method and apparatus for controlling the temperature of the granular solids entering the reactor. Such apparatus comprises, in accordance with this invention, means for utilizing temperature measurement of the regenerated granular solids at a defined portion of the cyclic process as a means for automatic control of the heating of the lift-gas in the lift-gas heating means. Thus, in more specific embodiment, the invention provides the improvement which comprises means, disposed at a point in the flow of regenerated granular solids from and including the lower portion of the regenerator to the pneumatic transport means, to generate an input function representative of the temperature of the regenerated granular solids flowing past the means so disposed, means for converting the input function to a signal proportional to the difference between the temperature represented by the input function and a desired temperature of the regenerated granular solids entering the reaction means, and means for applying the signal to control the heating of the lift gas in the lift-gas heating means.

The invention may be understood more readily by reference to the attached diagrammatic drawing and the following detailed description.

In the drawing there is shown a reactor 1 which is adapted to confine a compact downwardly-gravitating mass of granular solids and which may internally incorporate those features (not shown) well known in the art for inducing uniform flow, contacting, engaging and disengaging of the granular solids and the reactant stream. Reactant is continuously fed, such as via feed conduit 2, into reactor 1 and reaction product is continuously withdrawn from reactor 1, such as via reaction product outlet 3, while granular solids enter reactor 1 from a granular solids feed conduit 4 and are continuously downwardly passed at an elevated temperature through the reactor 1 and, via one or more reaction zone outlet conduits 5 to the upper end portion of regenerator 6. To remove the carbonaceous deposits which form on the granular solids as a side effect of hydrocarbon reactions at an elevated temperature in reactor 1, the granular solids are contacted at a higher temperature in the regenerator 6 with combustion-supporting gas which is continuously fed to the regenerator 6, such as via combustion gas inlet conduit 7. The combustibly removed deposits are continuously withdrawn from the regenerator 6 in the flue gas stream via flue gas outlets 8. The regenerated granular solids in regenerator 6 are continuously withdrawn in compact form from the regenerator 6 through regenerator outlet conduit 9, or by additional outlet conduits shown as 9', 9", and passed to a pneumatic lift pot 10. From the lift pot 10, the granular solids are carried upward through the lift pipe 11 to the lift separator 12 by a gas which is heated in a lift-gas heater 13 before its introduction into the lift pot 10. The lift gas is withdrawn from the lift separator 12 through a conduit 14, and the granular solids are withdrawn from the lift separator 12 through the granular solids feed conduit 4 and into the reactor 1.

The temperature to which the lift gas is heated in the lift-gas heater 13 is, as stated hereinbefore, an important factor in determining the temperature of the granular solids entering reactor 1 and accordingly, the temperature at which the hydrocarbon conversion reaction occurs and the nature of the products therefrom.

It has now been discovered that automatic control of the heating of the lift gas in the lift-gas heater 13, responsive to the temperature of the regenerated granular solids measured at a point or, as an average of a plurality of points, in the flow of granular solids from and including the lower portion of the regenerator 6 to the lift pot 10, can be used to quickly correct for the normal fluctuations in the temperature of the granular solids and thereby maintain the reactor temperature within the temperature range most desirable for high process efficiency. In an embodiment, a temperature sensing means 15, e.g., a thermocouple, is situated in the path of flow of granular solids from and including the lower portion of the regenerator 6 to the lift pot 10, for generating an input function representative of the temperature of the granular solids at such point. In other embodiments, a temperature sensing means shown as 15' is situated in a regenerator outlet conduit 9, or additional temperature sensing means shown as 15", 15''' can also be situated singularly and substantially similarly in additional regenerator outlet conduits 9' and 9", and the input function transmitted therefrom, as shown by broken lines in the drawing, is representative of the regenerated catalyst temperature in such regenerator outlet conduit 9 or, in the embodiment comprising a plurality of temperature sensing means, representative of an average of the regenerated catalyst temperatures in the plurality of regenerator outlet conduits. Such an input function is converted by a suitable temperature-recording control station TRC–1, as for example of the type manufactured by Moore Products (Model 5311 MP53T2), to a signal proportional to the difference between the temperature represented by the input function and a desired temperature for the regenerated granular solids entering the reactor 1. This signal is then applied to control the heating of the lift gas in the lift-gas heater 13, as, in an embodiment by controlling the fuel gas inlet valve 16 to the lift-gas heater 13. Preferably, there are inserted in the lift-gas heater fuel gas inlet control system a pressure control means shown as PC–1 so that fluctuations in the fuel gas source pressure are automatically offset by changes in the setting of the fuel gas inlet valve 16, and a temperature-indicating control means shown as TIC–1 so that fluctuations in the fuel gas heating value are automatically offset by changes in the setting of the fuel gas inlet valve 16. With further reference to the drawing, there is shown a suitable temperature-sensing location in the lift-gas heater outlet and, by a broken line, the transmission of such temperature to the temperature-indicating control means TIC–1 which, responsive to such temperature, alters the setting of the lift-gas heater fuel inlet valve 16 to compensate for changes in the heating value of the fuel gas.

In a more specific embodiment of the invention, the moving-bed system is operated using granular solids comprising an active cracking catalyst, and in which the regeneration step restores the effective activity of the catalyst by combustibly removing the carbonaceous deposits which inhibit such activity. The catalyst may be in any of many suitable forms and, as examples, in the form of pellets, pills, uniform granules, or spheres, and others. The term "granular," when used in this specification and the claims, refers broadly to particulate solids, whether regular or irregular, uniform or non-uniform. Although it is not intended to limit the granular solids to particular size, suitable particle sizes include the range of about 3–60 mesh, Tyler Screen Analysis, and preferably 4–12 mesh Tyler. The catalytic material may be natural or treated clays, illustrative of which are bentonite, montmorillonite, kaolin, etc., or they may be in the nature of certain synthetic associations of silica, alumina, silica and alumina, with or without various additions of metallic oxides.

In a typical application of the invention using such a cracking catalyst, the reactant enters the reactor 1 as a vaporized mixture of petroleum hydrocarbons, for example a 480–950° F. Mid-Continent gas oil cut. The reactant is preheated in a heater (not shown) to a temperature of 847° F. Active catalyst of the type described hereinbefore enters reactor 1 from feed conduit 4 at a temperature of 1060° F. and at a catalyst:gas oil ratio of 3.3 wt./wt. (3.6 vol./vol.). The hydrocarbon conversion reaction takes place at a "mix temperature" of reactant and catalyst of 965° F. and a pressure of 10 p.s.i.g. Conversion product is continuously withdrawn from the reactor 1 via conduit 3 and deactivated catalyst is continuously withdrawn from the reactor 1 at 900° F. through one or more reactor outlet conduits 5 to the upper end portion of regenerator 6. The combustion in the regenerator 6 of the deposits on the catalyst causes the catalyst temperature to rise to 1450° F. Ordinarily, the reaction step of the process is conducted so as to avoid a rate of coke deposition which would cause regenerator temperatures to exceed 1475° F., or, with the use of some aluminosilicate catalysts incorporating certain metallic oxides, 1350° F. If the catalyst is heated much in excess of these temperatures, a loss in catalytic activity occurs. To cool the regenerated catalyst to a temperature which can be withstood by the ordinary catalyst lift system such as in present use, heat is generally removed from the catalyst as it passes through the cooling zone 17. Regenerated catalyst is continuously withdrawn from the lower end of the regenerator 6 through one or more regenerator outlet conduits 9, 9', 9", at a temperature of 1075° F., and passed to the pneumatic lift pot 10. The lift-gas heater 13 in conventional use in such systems can be controlled to heat the lift gas to a temperature within the range of 300–1000° F. For use in systems employing a catalyst of the types described in connection with this embodiment of the invention, air is a suitable lift gas. The desired temperature of the lift gas is that which will alter the temperature of the regenerated catalyst with which it comes into contact in the pneumatic lift system 10–12 to that catalyst temperature desired as the reactor catalyst inlet temperature. In the present embodiment, the desired reactor catalyst inlet temperature of 1060° F. can be accomplished by controlling the lift-gas heater fuel gas inlet valve 16 to heat the air used as the lift gas in this embodiment of the invention to a temperature of 650° F. Such a control over fuel inlet valve 16 is accomplished by an automatic control device, as for example a temperature control station, shown in the drawing as TCR–1, which, responsive to the temperature of the regenerated catalyst, controls the setting of the lift-gas heater fuel gas inlet valve 16.

From the foregoing, it can be seen that variations in the temperature of the regenerated catalyst resulting from, for example, variations in the amount of coke on the catalyst before regeneration, can be offset by appropriate changes in the setting of the lift-gas heater fuel gas inlet valve 16, and further, that a constantly-operating automatic control of the lift-gas heater fuel gas inlet valve 16, made properly responsive to the temperature of the regenerated catalyst, will maximize the capacity of lift air temperature control for offsetting undesirable variations in the reactor catalyst inlet temperature.

Although the present invention has been described with preferred embodiments, it is to be understood that resort to modifications and variations may be had, without departing from the spirit and scope of this invention, as those skilled in the art will readily understand. Such variations and modifications are therefore considered to be within the purview and scope of the appended claims.

I claim:

1. In a continuous process employing a moving-bed system for the conversion of a hydrocarbon feed wherein said hydrocarbon feed is contacted in a reaction zone under conversion conditions including an elevated temperature with a mass of granular downwardly-gravitating solids, conversion product and spent granular solids are continuously withdrawn from the reaction zone, the spent granular solids are continuously passed from the reaction zone to a regeneration zone wherein carbonaceous deposits from the conversion reaction are combustibly removed whereby the temperature of the resulting regenerated solids withdrawn from the regeneration zone varies in the course of carrying out said continuous process, the regenerated granular solids are continuously withdrawn from the regeneration zone and passed to a pneumatic transport zone in which the solids are combined with a lift gas which is heated prior to such use and in which the solids are pneumatically transported by the lift gas to the reaction zone, a method for controlling the temperature of the regenerated solids to achieve a desired temperature of the regenerated solids entering the reaction zone which comprises generating an input function representing the temperature of the regenerated solids in said system at a point from and including the lower portion of the regeneration zone to the pneumatic transport zone, and applying said input function to automatically control the heating of the lift gas, prior to combination thereof with the regenerated solids in the pneumatic transport zone, so that the heated lift gas enters the pneumatic transport zone at a temperature which will cause the temperature of the regenerated solids to be adjusted during pneumatic transport to achieve substantially said desired temperature of the regenerated solids entering the reaction zone.

2. A method, as defined in claim 1, in which the input function is converted to a signal proportional to the difference between the temperature represented by the input function and a desired temperature of the regenerated granular solids entering the reaction zone, and the signal is applied to control the heating of the lift gas.

3. A method, as defined in claim 2, wherein the generated input function is representative of the temperature of the regenerated granular solids measured at a point in the flow of the granular solids in the lower end portion of the regeneration zone.

4. A method, as defined in claim 2, wherein the generated input function is representative of the temperature of the regenerated granular solids measured at a point in a stream of regenerated granular solids being withdrawn from the regeneration zone.

5. A method, as defined in claim 2, wherein the generated input function is representative of an average of temperatures of the regenerated granular solids measured at a plurality of points each of which is singularly and substantially similarly located in one of a plurality of streams of regenerated granular solids being withdrawn from the regeneration zone.

6. A method, as defined in claim 1, wherein the solids is a catalyst for cracking of hydrocarbons and the lift gas is air.

7. A method, as defined in claim 1, wherein the solids is a catalyst for cracking of hydrocarbons, the lift gas is air, and input function is generated that is representative of the temperature of the reactivated catalyst measured at a point in the flow of catalyst from and including the lower portion of the regeneration zone to the pneumatic transport of the catalyst to the reaction zone, the input function is converted to a signal proportional to the difference between the temperature represented by the input function and a desired temperature of the reactivated catalyst entering the reaction zone, and the signal is applied to control the heating of the lift air.

8. A method, as defined in claim 7, wherein the generated input function is representative of the temperature of the reactivated catalyst measured at a point in the flow of the catalyst in the lower end portion of the regeneration zone.

9. A method, as defined in claim 7, wherein the generated input function is representative of the temperature of the reactivated catalyst measured at a point in a stream of reactivated catalyst being withdrawn from the regeneration zone.

10. A method, as defined in claim 7, wherein the generated input function is representative of an average of temperatures of the reactivated catalyst measured at a plurality of points each of which is singularly and substantially similarly located in one of a plurality of streams of reactivated catalyst being withdrawn from the regeneration zone.

11. In combination with an apparatus adapted for the conversion of a hydrocarbon feed which comprises a reactor adapted for contacting a hydrocarbon under conversion conditions with a mass of granular downwardly-gravitating solids, means for feeding a hydrocarbon feed into said reactor and means for discharge of conversion product from said reactor, conduit means for passage of said solids from said reactor to a regenerator, said regenerator having means for introduction of a combustion-supporting gas into the regenerator and means for discharge of flue gas from said regenerator and in which regenerator the solids from the reactor gravitate downwardly as a mass from which carbonaceous deposits are combustibly removed, at least one conduit means for discharge of regenerated solids from said regenerator to a pneumatic transport means, said pneumatic transport means having means for combining the discharged regenerated solids with a lift gas in which the solids are carried to the reactor, and lift gas heating means for heating the lift gas prior to such use:

means for controlling the temperature of the regenerated granular solids to achieve a desired temperature of the regenerated solids entering the reactor, comprising temperature-measuring means disposed in the path of flow of solids from a point from and including the lower portion of the regenerator to the pneumatic transport means, and means responsive to said temperature-measuring means to automatically control the lift gas heating means to heat the lift gas, prior to combination thereof with the regenerated solids in the pneumatic transport means, to a temperature which will cause the temperature of the regenerated solids to be adjusted in the pneumatic transport means, to achieve substantially said desired temperature of the regenerated solids entering the reactor.

12. An apparatus, as defined in claim 11, in which the temperature-measuring means is adapted to generate an input function representative of the temperature of the regenerated granular solids flowing past the temperature measuring means, and further comprising means for converting the input function to a signal proportional to the difference between the temperature represented by the input function and a desired temperature of the regenerated granular solids entering the reactor, and means for applying the signal to control the heating of the lift gas in the lift-gas heating means.

13. An apparatus, as defined in claim 12, in which the temperature measuring means are disposed in the flow of regenerated granular solids in the lower end portion of the regenerator.

14. An apparatus, as defined in claim 12, which further comprises a plurality of conduit means through which the regenerated granular solids are continuously passed from the regeneration means to the pneumatic transport means, and in which temperature measuring means that generate an input function are disposed at a plurality of points each of which is singularly and substantially similarly located in one of the said plurality of conduit means.

15. An apparatus, as defined in claim 11, in which the temperature measuring means is disposed in a conduit in which solids flow from the regenerator to the pneumatic transport means.

References Cited by the Examiner
UNITED STATES PATENTS

| | | | |
|---|---|---|---|
| 2,661,321 | 12/1953 | Schulte | 208—174 |
| 2,752,231 | 6/1956 | Bearer | 208—165 |
| 2,901,421 | 8/1959 | Bourguet et al. | 208—174 |
| 2,905,538 | 9/1959 | McIntire | 208—174 |

DELBERT E. GANTZ, *Primary Examiner.*

ALPHONSO D. SULLIVAN, *Examiner.*